April 11, 1933.  D. FIRTH  1,903,446
AUTOMATIC CONTROL OF EXHAUST GASES FOR MIXTURE HEATING
Filed April 6, 1931  2 Sheets-Sheet 1
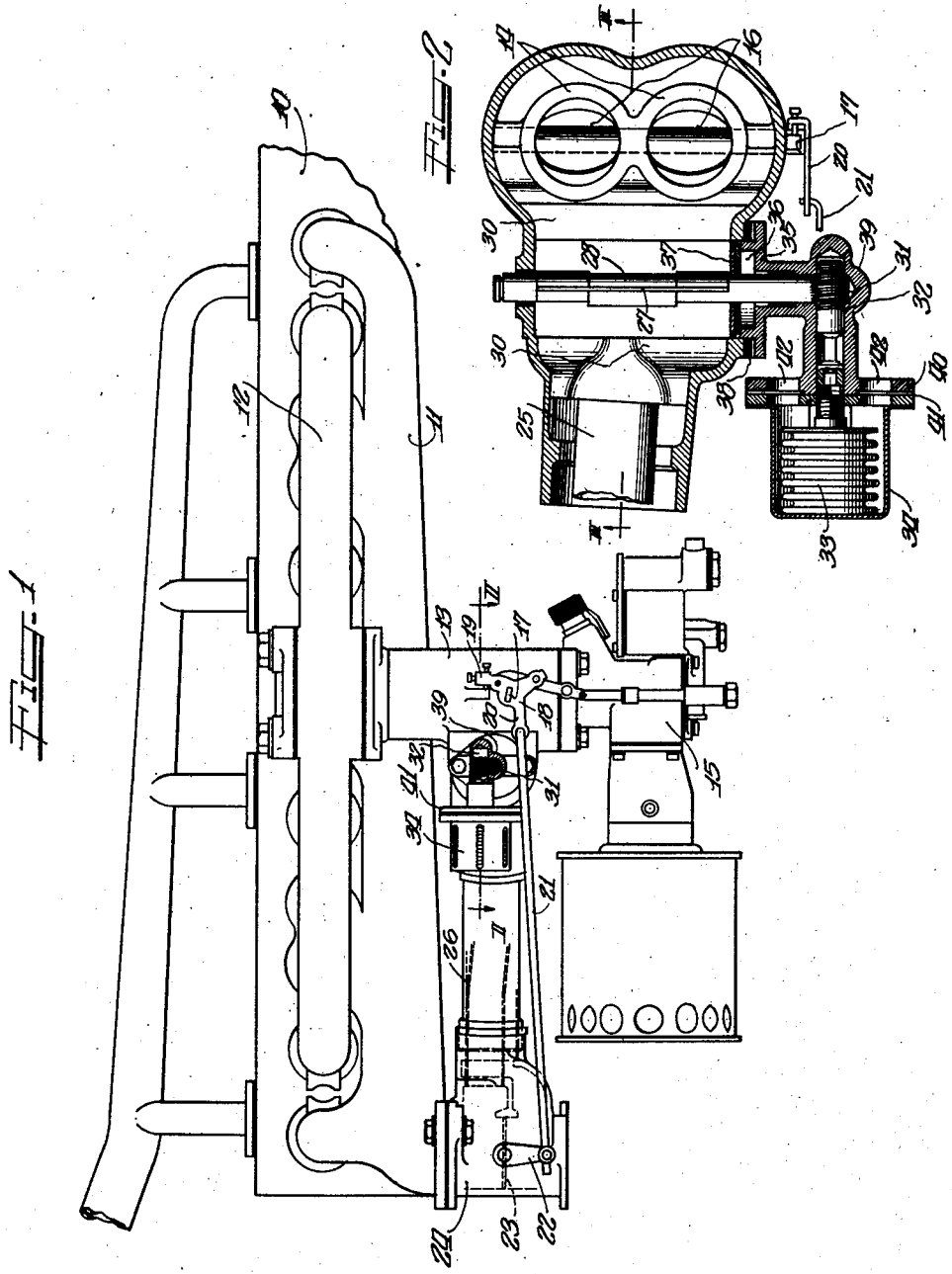
Inventor:
David Firth.
by: Charles H. Fields Attys.

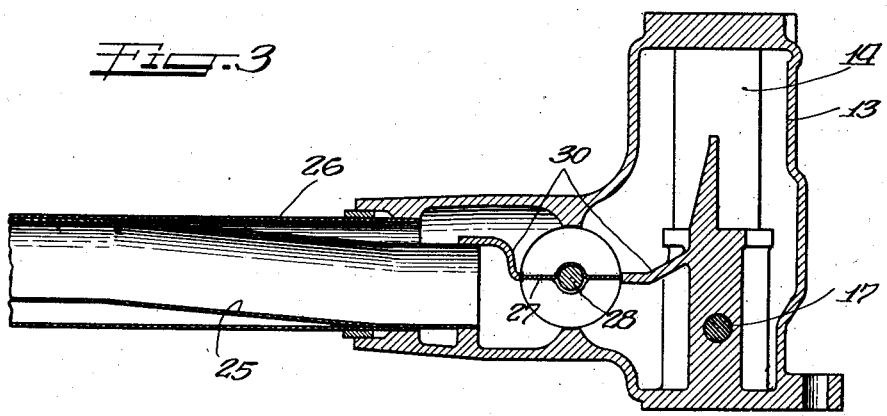
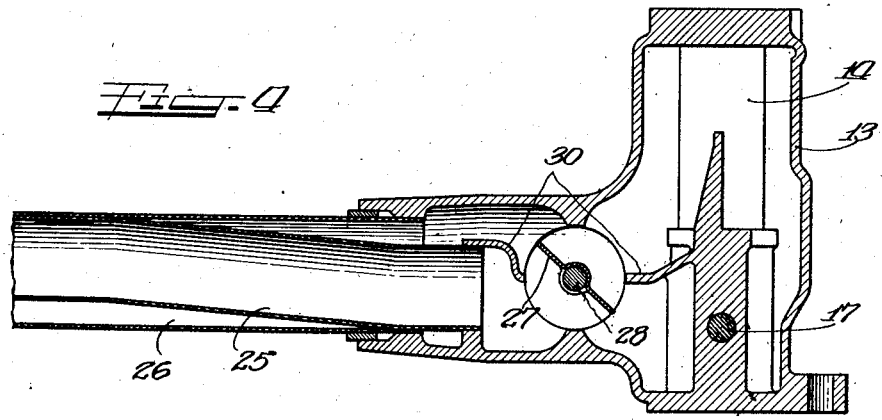
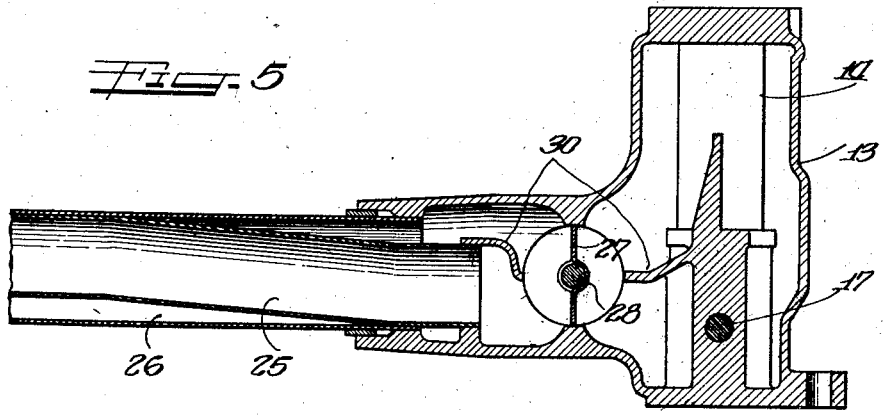

Patented Apr. 11, 1933

1,903,446

UNITED STATES PATENT OFFICE

DAVID FIRTH, OF FLINT, MICHIGAN, ASSIGNOR TO MARVEL CARBURETER COMPANY, OF FLINT, MICHIGAN, A CORPORATION OF ILLINOIS

AUTOMATIC CONTROL OF EXHAUST GASES FOR MIXTURE HEATING

Application filed April 6, 1931. Serial No. 528,217.

This invention relates to an improved heat control for the induction system of internal combustion engines.

It is a principal object of this invention to provide an improved and simplified heat control system adapted to automatically compensate for varying conditions of operation and engine temperature. In a carbureter type of engine operating under widely varying conditions of speed and load as well as temperature, as in automotive service for example, the maximum power output is obtainable when the engine is supplied with a cool incoming fuel and air mixture, since the cooler the mixture the greater the weight of unit charges supplied to the engine cylinders.

It is another object of this invention to provide an improved and simplified automatic heat control system for internal combustion engines wherein a throttle control varies the heat supplied in accordance with load conditions, to provide the maximum heat under idling conditions, and wherein this control is modified by a thermostatic control, the responsiveness of which is balanced between radiation or hood temperatures and conductivity from the heated manifold, the balance being predetermined to limit the effectiveness of the heat conducted to the thermostat. By controlling the effect of conductivity the operation of the heat control system is improved, since when operating a vehicle at high road speeds the increased air flow through the radiator decreases the hood temperature below that occurring at lower speeds, so that if the thermostat responded to radiation only it would allow more heat to be supplied to the induction system, a result opposite to that required under the specified operating conditions. By arranging for a predetermined conductivity effect on the thermostat, the greater volume of exhaust gas flow at high speeds will result in increased conductivity to offset the drop in hood temperatures, so that by a proper control of conductivity the desired operating conditions can be maintained. A further advantage of the combination of radiation and a limited conductivity energization of the thermostat results when decelerating since during a period of high speed operation a considerable amount of heat is stored up in the metal of the induction system, so that when the vehicle is slowed down there is enough residual heat for satisfactory engine operation and the responsiveness of the thermostat to conducted heat causes an expansion thereof which cuts off additional heat supply to the induction system.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary side elevation of an engine cylinder block to which a manifolding system embodying this invention has been applied.

Figure 2 is an enlarged section on the line II—II of Figure 1 to show the position of the thermostatic control relative to the jacketed induction manifold riser.

Figures 3, 4 and 5 are fragmentary sections on the line III—III of Figure 2.

Figure 3 illustrates the heat on position of the thermostatically operated valve for cold engine conditions.

Figure 4 shows the heat control valve in a mid-position corresponding to a normal operating temperature.

Figure 5 shows the control valve in the extreme cool position for shutting off the supply of heat to the jacketed manifold.

As shown on the drawings:

An internal combustion engine cylinder block is indicated by the reference numeral 10 in Figure 1, an exhaust manifold 11 being applied to exhaust ports in the side thereof in the usual manner. Similarly, an intake manifold 12 is applied to intake ports, alternating in position with the exhaust ports, and this intake manifold is fed by a central riser having a heating jacket 13 therearound. As shown in the section of Figure 2 the riser comprises twin passages 14; which are fed by a duplex carbureter 15. The duplex form of manifold is of advantage for multiple cylinders to prevent a surging flow in the horizontal manifold 12 but forms no part of the present invention.

A duplex type of throttle valve 16 is positioned in each passage 14 of the riser, the two throttle valves being mounted on a common shaft 17 externally operable by a throttle lever 18 including an idling adjustment arm 19, and a heat control lever arm 20 which is connected by a rod 21 to a lever 22 operating a main heat diversion valve 23 shown dotted in Figure 1 as mounted in an exhaust diversion valve body 24. The valve 23 serves when in the position shown to divert exhaust gases from the exhaust manifold 11 to a pipe 25 leading to the riser heating jacket 13 from which the gases return to the exhaust diversion valve body, below the valve therein, through an outer pipe 26 enveloping the supply pipe 25. This arrangement is advantageous from an appearance standpoint and because the supply of exhaust gases is protected from undue cooling by the returning gases.

The above described manifold heating system could be designed for satisfactory operation at a predetermined uniform operating temperature, since the throttle control of the diversion valve 23 would result in the maximum diversion of exhaust gases under idling conditions, with a decreasing diversion of exhaust gases to the heating jacket as the throttle was opened, until the diversion valve became turned to a substantially vertical position, under which conditions the exhaust gases would have an unobstructed passage straight through the diversion valve body so that substantially no heat would be supplied to the manifold heating jacket, a result highly desirable for the production of maximum power in the upper range of throttle openings.

However the foregoing arrangement would be lacking in flexibility to meet warming up conditions, or to operate satisfactorily under temperature conditions other than normal as for example under varying climatic conditions. To provide proper flexibility to meet varying operating conditions I provide a thermostatically controlled valve 27 in the connections between the exhaust diversion valve and the manifold heating jacket, which valve is so arranged that it can bypass all or part of the exhaust gas flow from the supply pipe 25 to the return pipe 26, thus reducing the flow of exhaust gases through the manifold heating jacket. I have found that it is desirable to have the thermostatic control chiefly responsive to air or hood temperatures, but balanced by a limited response to conducted heat from the metal of the heating jacket or manifold, because of the residual heat stored up therein under operating conditions.

The valve 27 is mounted on a cross shaft 28 in a side housing 29 on the riser jacket, the housing being arranged to receive the ends of the pipes 25 and 26 and having a partition 30, of which the valve forms a continuation when the valve is in its horizontal position. The partition 30 is continued to the center line of the riser jacket and preferably is so arranged that the exhaust gas supply pipe 25 discharges below the partition so that the hottest gases first circulate around the throttle location and then rise over the partition 30 to return over valve 27 to the outer return pipe 26.

One method of operating the valve 27 is to provide gear teeth 31 on the shaft 28 thereof operable by a reciprocating piston 32 having rack teeth formed by a worm-like thread cut thereon, which piston is connected to a thermostat comprising an expansible corrugated sealed cylinder 33 containing an expansible or volatile fluid which expands or vaporizes in a predetermined manner in response to temperature increases. Such thermostats per se are well known and can be selected to have a predetermined rate of movement in the desired range of temperature control. The thermostatic cylinder 33 is preferably mounted in a protective housing 34 separate from the manifolding system of the engine in order that the surrounding air temperature may have the maximum effect thereon. Under such circumstances, if conductivity of the necessary mounting be temporarily neglected, the thermostatic control will be responsive to the surrounding air temperatures; in the case of an automotive vehicle of the hood temperatures which are normally higher than free atmospheric temperatures due to the heat of the engine and the prior heating effect of the usual radiator on the air flow therethrough.

In order to control the conductivity of the thermostatic mounting to give the desired balancing effect of the manifold temperatures on the thermostat, I have found it desirable to partially insulate the thermostat mounting from the manifold heating jacket. To this end the valve shaft 28 is mounted at the gear end thereof in a mounting collar 35 having a pocket 36 therein covered by a pair of insulating washers 37 which form an insulating air space. The collar is further insulated from the housing 29 by gaskets 38. The collar 35 is formed with an elbow 39 suitably journalled for the valve shaft 28 and the thermostat piston 32 and the elbow carries a mounting flange 40 to receive the thermostat cover 34. The flange 40 is provided with a gasket 41 and is also perforated as at 42 to further reduce the conductivity of the mounting. The resulting reduced heat conductivity of the mounting has been found to properly balance the direct or air temperature responsiveness of the thermostat to accomplish an improved combined control which differentiates between variations in engine operating temperatures due to varying air temperatures and those due to varying operating speeds and loads.

In the operation of the heat control of this invention the interconnected throttle and diversion valve serves to supply maximum heat under idling conditions and minimum heat under the higher range of throttle operation. This is desirable since the engine requirements are affected by the load and also because a much greater volume of exhaust gases is available under conditions of wide throttle openings when such volume is least required for heating purposes. The thermostatic control further modifies the heat supply to the induction system in accordance with air and manifold temperatures. In starting up a cold engine or under cool air conditions the thermostat is contracted and holds the valve 27 in the position of Figure 3 where all exhaust gases diverted by the valve are caused to flow through the manifold heating jacket before returning to the exhaust pipe. As the engine warms up, even on a cold day, the hood temperatures as well as manifold metal temperatures increase with the result that the thermostat is warmed to a greater or less extent and its expansion rotates the valve into the position of Figure 4, or even to that of Figure 5 under extreme conditions. In Figure 4 it will be evident that a portion of the exhaust gases are available for heating the induction system while a portion are permitted to escape past the valve directly to the return pipe 26. Figure 5 shows the valve 27 turned to its extreme cool position allowing and in fact forcing the bypassing of all the gas flow directly to the return pipe 26. This position is very desirable after the engine is warmed up in extremely warm climates and in fact under normal conditions if the carbureter side of the engine is so shielded as to cause high hood temperatures.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a device to divert products of combustion from the exhaust conduit of an automobile engine to heat the combustible mixture, a heating chamber in heat exchanging relationship to the mixture conduit, said heating chamber having an entrance and an exit, passages connecting said entrance and said exit to said exhaust conduit, a bypass passage between said entrance and exit passages, a valve in said bypass passage, and a thermo sensitive element to operate said valve, a valve in said exhaust conduit, a throttle valve in said mixture conduit, and means inter-connecting said last mentioned valves for coincident operation.

2. In a device to divert products of combustion from the exhaust conduit of an automobile engine to heat the combustible mixture, a heating chamber in heat exchanging relationship to the mixture conduit, said heating chamber having an entrance and an exit, passages connecting said entrance and said exit to said exhaust conduit, a bypass passage between said entrance and exit passages, a valve in said bypass passage, and a thermosensitive element to operate said valve, said thermosensitive element being responsive to the temperature of the air contiguous to said engine, a valve in said exhaust conduit, a throttle valve in said mixture conduit, and means inter-connecting said last mentioned valves for coincident operation.

3. In a device to divert products of combustion from the exhaust conduit of an automobile engine to heat the combustible mixture, a heating chamber in heat exchanging relationship to the mixture conduit, said heating chamber having an entrance and an exit, passages connecting said entrance and said exit to said exhaust conduit, a bypass passage between said entrance and exit passages, a valve in said bypass passage and a thermosensitive element to operate said valve, said thermosensitive element being responsive to the temperature of the air contiguous to said engine, and means attaching said thermosensitive element to said engine to provide a conductor of heat to said element.

4. In a device to divert products of combustion from the exhaust conduit of an automobile engine to heat the combustible mixture, a heating chamber in heat exchanging relationship to the mixture conduit, said heating chamber having an entrance and an exit, passages connecting said entrance and said exit to said exhaust conduit, a bypass passage between said entrance and exit passages, a valve in said bypass passage, a thermosensitive element to operate said valve, and means supporting said thermosensitive element to operate said valve, and means supporting said thermosensitive element on said engine so that it is heated by the joint effect of the radiation from the engine, the conveyed heat from the radiator by the moving air and the conducted heat through the supports.

5. In a device to divert products of combustion from the exhaust conduit of an automobile engine to heat the combustible mixture, a heating chamber in heat exchanging relationship to the mixture conduit, said heating chamber having an entrance and an exit, passages connecting said entrance and said exit to said exhaust conduit, a bypass passage between said entrance and exit passages, a valve in said bypass passage, and a thermosensitive element to operate said valve, and means supporting said thermosensitive element on said engine so that it is heated by the joint effect of the radiation from the engine, the conveyed heat from the radiator by the moving air and the conducted heat through the supports, and means to restrict the conductivity of said supports.

6. A heat control for the induction system of an internal combustion engine, comprising a heating jacket associated with the induction system, means for diverting a heating fluid through said heating jacket, a bypass valve for variably bypassing said heating fluid away from said heating jacket, and thermostatic means for controlling said bypass valve, said thermostatic means being so mounted relative to the induction system that it is fully responsive to the surrounding air temperature and has a limited responsiveness to the heat conducted to the thermostat from the metal of the induction system.

7. A heat control for the induction system of an internal combustion engine, comprising a heating jacket associated with the induction system, means for diverting a heating fluid through said heating jacket, a throttle control of the diversion of the supply of heating fluid, a bypass valve for variably bypassing said heating fluid away from said heating jacket, and thermostatic means for controlling said bypass valve, said thermostatic means being so mounted relative to the induction system that it is adapted to secure a balance between the surrounding air temperature and to the heat conducted to the thermostat from the metal of the induction system.

8. A heat control for the induction system of an internal combustion engine, comprising a heating jacket associated with the induction system, means for diverting a heating fluid through said heating jacket, a bypass valve for variably bypassing said heating fluid away from said heating jacket, and thermostatic means for controlling said bypass valve, and mounting means for said thermostatic means for limiting the conductivity of heat from said induction system to said thermostatic means whereby to obtain a predetermined balance between the effect of the surrounding air temperature and the heat stored up in the metal of the induction system.

9. A heat control for the induction system of an internal combustion engine, comprising a heating jacket associated with the induction system, means for diverting a heating fluid through said heating jacket, a throttle control of the diversion of the supply of heating fluid, a bypass valve for variably bypassing said heating fluid away from said heating jacket, and thermostatic means for controlling said bypass valve, and mounting means for said thermostatic means for limiting the conductivity of heat from said induction system to said thermostatic means whereby to obtain a predetermined balance between the effect of the surrounding air temperature and the heat stored up in the metal of the induction system.

In testimony whereof I have hereunto subscribed my name at Flint, Genesee County, Michigan.

DAVID FIRTH.